United States Patent [19]

Copp et al.

[11] Patent Number: 4,875,728
[45] Date of Patent: Oct. 24, 1989

[54] BUMPER FACIA ATTACHMENT STRUCTURE

[75] Inventors: David F. Copp, Dryden; Stephen J. Wojciehowski, Sterling Heights, both of Mich.

[73] Assignee: Chrysler Motors Corporation, Highland Park, Mich.

[21] Appl. No.: 245,232

[22] Filed: Sep. 16, 1988

[51] Int. Cl.⁴ .................. B60R 19/02; B60R 19/24
[52] U.S. Cl. .................. 293/126; 293/142; 293/154; 293/155
[58] Field of Search .............. 293/126, 102, 127, 128, 293/142, 154, 155; 403/381, 331, 406.1

[56] References Cited

U.S. PATENT DOCUMENTS 4,095,831 6/1978 Hagiwara et al. .............. 293/155
4,695,084 9/1987 Hlavach .......................... 293/126

FOREIGN PATENT DOCUMENTS 0018540 1/1982 Japan .................. 293/154
0004443 1/1985 Japan .................. 293/154
2084942 4/1982 United Kingdom ....... 293/142

Primary Examiner—Andres Kashnikow
Assistant Examiner—Mark T. Le
Attorney, Agent, or Firm—Edward A. Craig

[57] ABSTRACT

A bumper facia attachment structure is provided for application to automotive vehicles having a bumper facia unit mounted over a structural bumper. The bumper facia is the type having end pieces extending around the front and/or rear of the vehicle. The end pieces are attached by way of a fastener to a generally C-shaped retainer clip mounted on the lateral sheet metal fenders of the automotive vehicle.

3 Claims, 2 Drawing Sheets

U.S. Patent  Oct. 24, 1989  4,875,728
FIG. 4
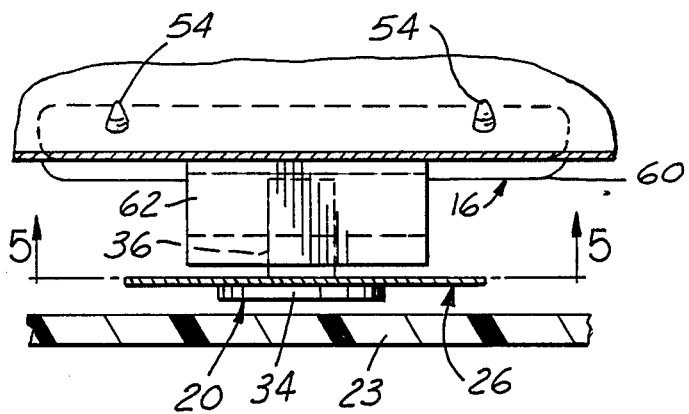
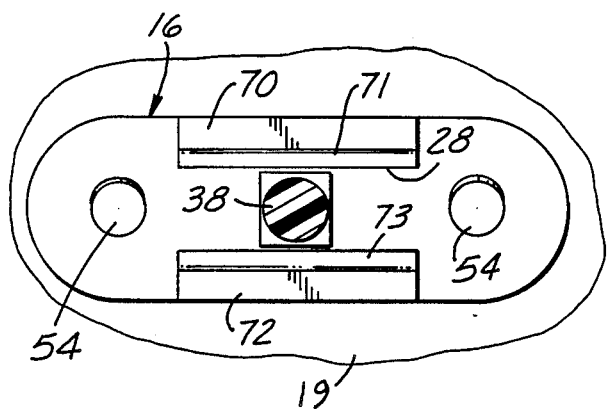
FIG. 5
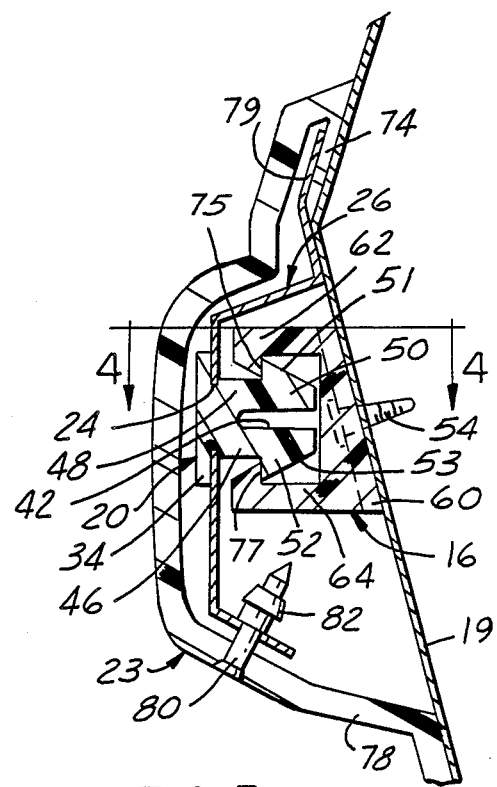
FIG. 3

BUMPER FACIA ATTACHMENT STRUCTURE

BACKGROUND OF THE INVENTION

1. Field of the Invention:

This invention relates to a bumper facia attachment structure and means, as may be utilized in automotive vehicles, that allows for the easy installation and removal of the bumper facia unit.

2. Prior Art:

The aim of this invention is to provide a bumper facia attachment structure which allows the bumper facia unit to be easily installed during vehicle assembly and easily removed and reinstalled when service to the structural bumper, or the bumper facia unit itself, is required. The bumper facia unit is used to cover a structural bumper. A structural bumper may be described as a bumper designed to absorb a significant amount of impact upon collision with another vehicle or stationary object. Currently, the bumper facia attachment means employed cause the bumper facia unit to be somewhat difficult to remove and install.

Government regulations have required that the bumpers of automotive vehicles be constructed and mounted in a manner such that damage will not occur to the bumper of the vehicle during low speed collisions involving other vehicles or stationary objects. The prevailing method in the industry for accomplishing these objectives has been to attach a structural bumper to the vehicle by way of shock absorbing devices.

In an effort to reduce costs, increase performance and to improve appearances, it is a general practice to cover structural bumpers with flexible bumper facia units. The bumper facia unit is mounted over the top of the structural bumper. Bumper facia units are primarily constructed of formed plastic. This in and of itself has eliminated some of the need for rustproofing and chrome plating of the external structural bumpers.

A common styling feauure of bumper facia is to provide end pieces which wrap around the vehicle body. The facia is fabricated of a flexible plastic material which results in the end pieces being floppy and not self-supporting. The central section of the facia is directly fastened to the structural bumper. It is, however, necessary to also fasten the facia end pieces to the vehicle body.

Of necessity, the fastening devices for securing the end pieces in place must be hidden in order not to destroy the ornamental appearance of the facia. Usually, a retainer clip has been provided on the vehicle body and a mating fastener has been provided in the inner face of the facia end piece. The end pieces are usually secured in place after the central portion of the facia has been secured to the structural bumper. Frequently, there is some small misalignment of the retainer clip and end piece fastener. The fact that these parts are hidden from view has made it somewhat difficult for the installer to properly align the clip and fastener, thereby frequently incurring a time penalty. Further, the fasteners have not been easy to disengage thereby complicating the task of later servicing the bumper/facia for repairs.

In accordance with the present invention, an attachment means are provided having a retainer clip with an elongated fastener entrant slot which automatically compensates for misalignment. The slot is open ended and permits disengagement of the fastener by simply sliding the fastener past the open end. This does not cause damage to either the retainer clip or fastener as has been common in the past and permits easy re-installation using the same attachment structure.

SUMMARY OF THE INVENTION

Attachment structure is provided for securing the end pieces of a vehicle bumper facia to a vehicle body. The vehicle bumper facia is of the type fabricated of a flexible plastic material and comprises an elongated central portion. The vehicle body includes a structural bumper member. The central portion of the facia is attached to the structural bumper member.

A facia end piece extends from each end of the central portion longitudinally of the vehicle body. A fastener fabricated of flexible material is secured to the inner face of each end piece. Each fastener includes a stem which extends toward the vehicle body. The stems are bifurcated and each stem defines a pair of spaced apart flexible tangs. Each tang terminates in an enlarged portion.

An elongated retainer clip fabricated of flexible material is mounted on each side of the vehicle body in a position oppositely deposed from one of the stems. The clips are generally C-shaped in cross-section and include a back wall, upper and lower side walls extending outwardly therefrom and downwardly and upwardly extending lips on the outer edges of the respective upper and lower side walls. The lower and upper edges of, respectively, the upper and lower lips are spaced apart to define an elongated open-ended slot.

The fasteners are engaged with the retainer clips by forcing the stems into the slots with initial flexing of the tangs together and flexing of the upper and lower side walls of the retainer clip apart to permit passage of the enlarged portions through the slots with subsequent springing of the tangs apart and the side walls together. The enlarged portions thereafter engage the inner surfaces of the lips to prevent withdrawal thereof through the slots. The fasteners are disengagable from the retainer clips by sliding them past the open ends of the slots which are closest to the central portion of the facia.

The lower and upper edges of the lips are preferable angled downwardly and inwardly and upwardly and inwardly respectively to define a guide structure for flexing of the tangs together during engagement of the fasteners with the retainer clips. The enlarged portions of the tangs have cooperating angled surfaces.

IN THE DRAWINGS

Other objects, features and advantages of the present invention will become more apparent from the following detailed description of the preferred embodiment, the appended claims and in the accompanying drawings in which:

FIG. 3 is a vertical sectional view of the bumper facia and attachment structure mounted in place;

FIG. 4 is a sectional view taken substantially along the line 4—4 of FIG. 3 looking in the direction of the arrows; and FIG. 5 is a sectional view taken substantially along the line 5—5 of FIG. 4 looking in the direction of the arrows.

DETAILED DESCRIPTION OF THE PREFERRED EMBODIMENT

Figure 1:
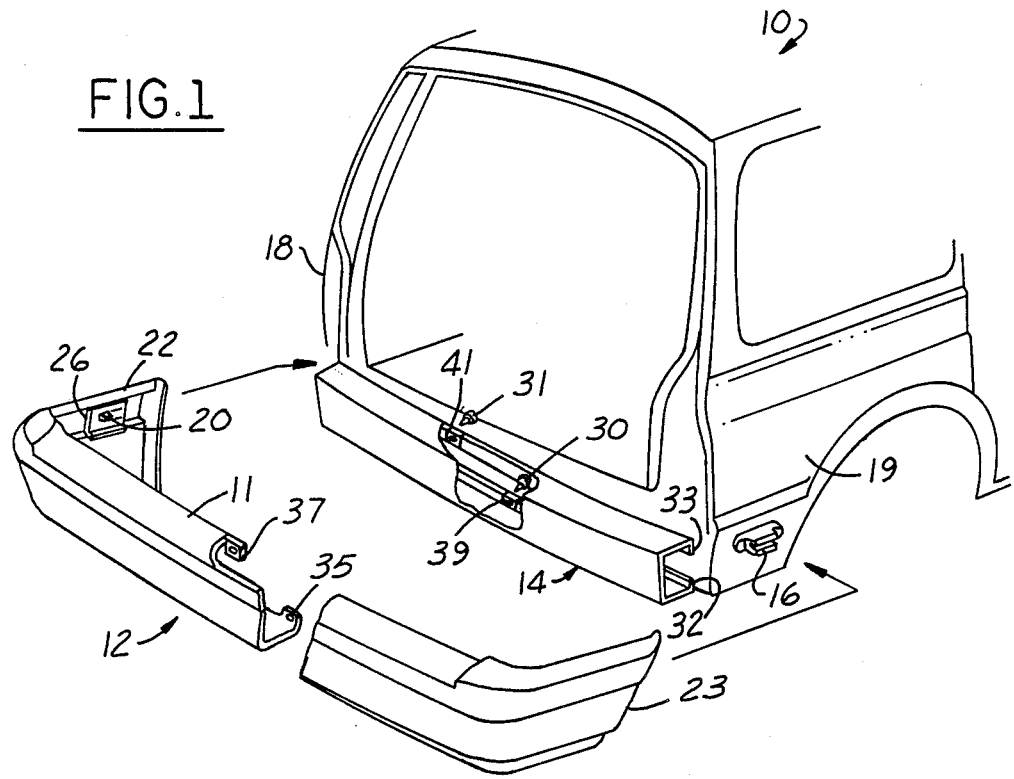
FIG. 1 is an explode perspective view of the rear end of an automotive vehicle illustrating the bumper facia attachment structure embodied in the present invention.
Figure 2:
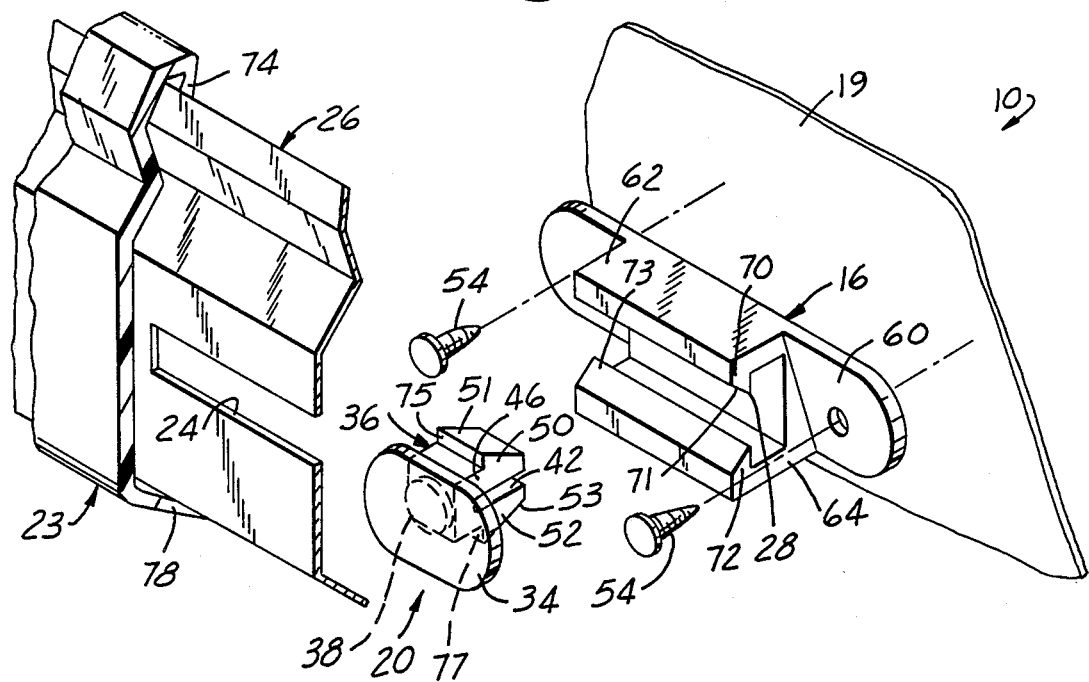
FIG. 2 is an exploded perspective view illustrating the bumper facia attachment structure embodied in the present invention.

Referring to FIGS. 1 and 2, the rear end of an automotive vehicle 10 is shown prior to the mounting of the bumper facia unit 12 over the top of the structural bumper 14. The facia unit 12 is fabricated of a flexible plastic material. The facia unit 12 includes a central portion 11 having end pieces 22, 23 which wrap around the fenders 18, 19 of the vehicle 10. The end pieces are floppy and must be attached to the fenders 18, 19 for support. A generally C-shaped retainer clip 16 is mounted on each sheet metal fender 18, 19 of the vehicle 10. A fastener 20 is indirectly attached to the inner face of each end piece 22, 23 of the bumper facia unit 12 by being inserted through a slot 24 in a metal retainer bracket 26.

The bumper facia end pieces 22, 23 are secured to the metal retainer brackets 26 on their upper marginal edges 74 by a bracket flange 79. The lower marginal edges 78 of the bumper facia end pieces 22, 23 are attached to the metal retainer bracket 26 by means of a screw 80 and nut 82 (FIG. 3).

The bumper facia unit 12 is mounted to the vehicle 10 by aligning the fasteners 20 with the elongated open-ended slots 28 of the C-shaped retainer clips 16 and then forcing the fasteners 20 through the slots 28. The central portion 11 of bumper facia unit 12 is attached to the structural bumper 14 prior to mounting on vehicle 10. This is accomplished by a plurality of bolts 30, 31 being inserted through slots located in a plurality of spaced apart upwardly and downwardly extending tabs 35, 37 provided on the inner edges of the bumper facia 12 central portion 11 (FIG. 1). Upwardly and downwardly extending flanges 32, 33 of the structural bumper 14 have mounted thereon nuts 39, 41 which threadingly receive the bolts 30, 31 to secure the bumper facia 12 in place. This whole unit is then mounted on vehicle 10.

The fasteners 20, which are fabricated of a flexible material such as nylon, have an oblong base 34 with rounded ends. From the center of the oblong base 34 extends a stem 36. The stem 36 has a round portion 38 of reduced diameter which defines a notch which is utilized in holding the fastener 20 in the slot 24 of the metal retainer bracket 26. The stem 36 is bifurcated by a channel 42. Two spaced apart flexible tangs 46 and 48 are created by the channel 42. At each outer end of each flexible tang 46 and 48 is an enlarged portion 50, 52. The portions 50, 52 have converging angled surfaces 51, 53 for easy insertion through slot 28 of clip 16. The portions 50, 52 are squared off at their outer ends.

The C-shaped retainer clips 16 are mounted to the lateral sheet metal fenders 18, 19 by drill screws 54. Screws 54 extend through apertures located on each end of the oblong base or back wall 60 of the C-shaped retainer clip 16 and through the sheet metal of fenders 18, 19.

The C-shaped retainer clips 16 are oriented with respect to the lateral sheet metal fenders 18, 19 of the automotive vehicle 10 in such a manner that the upper side walls 62 and lower side walls 64 both extend outwardly from the back wall 60. Downwardly and upwardly extending lips 70, 72 are provided on the outer edges of the respective upper and lower side walls 62, 64. The lower and upper edges 71, 73 of upper lip 70 and lower lip 72 converge downwardly and inwardly and upwardly and inwardly, respectively, toward each other and the back wall 60. The distance between the upper lip 70 and the lower lip 72 is therefore narrowest at the lips' inner edges. However, there is sufficient space so that when the tangs 46, 48 are compressed towards each other, the enlarged portions 50, 52 can pass by. The clips 16 are fabricated of a flexible material, such as nylon, permitting the side walls 62, 64 to flex outwardly and thereby enlarge the slot 28 temporarily to facilitate passage of the enlarged portions 50, 52. The angled edge surfaces 71, 73 define a guide structure for flexing the tangs 46, 48 together during engagement of the fasteners 20 with the retainer clips 16. The enlarged portions 50, 52 have the aforementioned cooperating angled surfaces 51, 53.

When the fastener stems 36 are forced through slot 28 of the C-shaped retainer clip 16, the flexible tangs 46 and 48 collapse toward each other closing off channel 42. The fastener 20 continues to be constricted until the portions 50 and 52 pass by the inner edges of lips 70 and 72. The resilience of the material of the fastener 20 then induces the flexible tangs 46 and 48 to return to their original positions. Once returned to their pre-installation positions, the flanges 50 and 52 which have vertical flat surfaces 75, 77 come into contact with the inner edges of lips 70 and 72. This prevents the fastener 20 from being disengaged from the C-shaped retainer clip 16 in a reverse process. As will be appreciated, the stems 36 may be misaligned somewhat upwardly or downwardly or forwardly or rearwardly and will still be received in slots 28.

For the purpose of servicing the bumper structure or adjacent vehicle structure, it is sometimes necessary to remove the facia unit 12 or at least disconnect one or both of the end pieces 22, 23. The end pieces can be disconnected by sliding the fasteners 20 past the open ends of the slots 28 which are closest to the central portion 11 of the facia unit 12. Thus, with a front end bumper, the end pieces 22, 23 are moved forwardly and with a rear end bumper, they are moved rearwardly. The end pieces 22, 23 may be flexed to accomplish this without detaching the central portion 11. Reattachment is as above described.

We claim:

1. Attachment structure for securing the end pieces of a vehicle bumper facia to a vehicle body, the vehicle bumper facia being of the type fabricated of a flexible plastic material and including an elongated central portion, the vehicle body including a structural bumper member, said central portion being attached to the structural bumper member, a facia end piece extending from each end of the central portion longitudinally of the vehicle body, a fastener fabricated of a flexible material secured to the inner face of each end piece, each fastener including a stem which extends toward the vehicle body, the stems being bifurcated and each stem defining a pair of spaced apart flexible tangs, each tang terminating in an enlarged portion, an elongated retainer clip fabricated of flexible material mounted on each side of the vehicle body in a position oppositely disposed from one of the stems, each retainer clip being generally C-shaped in cross-section and including a back wall, upper and lower side walls extending outwardly therefrom and downwardly and upwardly extending lips on the outer edges of the respective upper and lower side walls, the lower and upper edges of, respectively, the upper and lower lips being spaced apart to define an elongated open ended slot, the fasteners being engaged with the retainer clips by forcing the stems into the slots with initial flexing of the tangs together and flexing of the upper and lower side walls of the retainer clip apart to permit passage of the enlarged portions through the slots with subsequent springing of the tangs apart and the side walls together, the enlarge portions thereafter engaging the inner surfaces of the lips to prevent withdrawl thereof through the slots, the retainer clips being positioned with respect to the end pieces and fasteners when the end pieces are secured in place by the fasteners to permit disengagement of the fasteners from the retainer clips by flexing the end pieces and sliding the fasteners past the open ends of the slots of the retainers clips which are closest to the central portion of the vehicle bumper facia.

2. Attachment structure as defined in claim 1, further characterized in that the lower and upper edges of the lips are angled downwardly and inwardly and upwardly and inwardly, respectively, to define a guide structure for flexing of the tangs together during engagement of the fasteners with the retainer clips, said enlarged portions of the tangs having cooperating angled surfaces.

3. Attachment structure as defined in claim 2, further characterized in that said enlarged portions have vertical flat surfaces spaced inwardly from the outer ends of the tangs for positive engagement with said lips after insertion of the enlarged portions through the slots.

* * * * *